United States Patent
Leung et al.

(10) Patent No.: US 7,937,280 B1
(45) Date of Patent: May 3, 2011

(54) PLANNING AND SCHEDULING OF MAINTENANCE, REPAIR, AND OVERHAUL SERVICES

(75) Inventors: Heung-Wah Leung, Lexington, MA (US); Jonathan Cherneff, Milton, MA (US); Feng Liu, Winchester, MA (US); Tassio Carvallo, Cambridge, MA (US)

(73) Assignee: i2 Technologies US, Inc., Dallas, TX (US)

( * ) Notice: Subject to any disclaimer, the term of this patent is extended or adjusted under 35 U.S.C. 154(b) by 1410 days.

(21) Appl. No.: 10/011,572

(22) Filed: Nov. 12, 2001

Related U.S. Application Data (60) Provisional application No. 60/281,104, filed on Apr. 2, 2001.

(51) Int. Cl.
*G06F 9/44* (2006.01)
(52) U.S. Cl. .......................................................... 705/6
(58) Field of Classification Search ................... 705/7, 8; 700/97, 99, 100
See application file for complete search history.

(56) References Cited

U.S. PATENT DOCUMENTS

| | | | | |
|---|---|---|---|---|
| 5,216,612 A | * | 6/1993 | Cornett et al. ................. | 700/96 |
| 5,231,567 A | * | 7/1993 | Matoba et al. ................ | 700/100 |
| 5,287,267 A | | 2/1994 | Jayaraman et al. ........... | 364/403 |
| 5,369,570 A | * | 11/1994 | Parad ............................... | 705/8 |
| 5,442,561 A | * | 8/1995 | Yoshizawa et al. ........... | 700/100 |
| 5,623,416 A | * | 4/1997 | Hocker, III ..................... | 702/64 |
| 5,630,070 A | * | 5/1997 | Dietrich et al. ................. | 705/8 |
| 5,765,143 A | | 6/1998 | Sheldon et al. ................. | 705/28 |
| 5,826,040 A | * | 10/1998 | Fargher et al. ................... | 705/8 |
| 5,835,898 A | * | 11/1998 | Borg et al. ........................ | 705/8 |
| 5,848,403 A | * | 12/1998 | Gabriner et al. ................ | 706/13 |
| 5,946,662 A | | 8/1999 | Ettl et al. ........................... | 705/8 |
| 5,974,395 A | | 10/1999 | Bellini et al. ..................... | 705/9 |
| 6,006,171 A | * | 12/1999 | Vines et al. .................... | 702/184 |
| 6,119,102 A | * | 9/2000 | Rush et al. ....................... | 705/29 |

(Continued)

OTHER PUBLICATIONS

Stein, Tom, "Enterprise Apps-Not Just ERP Anymore", Information Week, Dec. 1, 1997 [retrieved Mar. 16, 2006], pp. 1-6, retrieved from: Dialog, file 9.*

(Continued)

*Primary Examiner* — Peter Choi
(74) *Attorney, Agent, or Firm* — Booth Udall, PLC; Steven J. Laureanti (57) ABSTRACT

A system (10) for planning and scheduling service events for one or more assets includes a demand optimizer engine (12) that receives information regarding future service requirements for an asset and operating characteristics of the asset. The demand optimizer engine (12) also generates a service plan identifying one or more planned service events during which one or more services are to be performed on the asset and identifying a planned start time and a planned end time for each service event so as to minimize the amount of time the asset is non-operational and the costs associated with each service event. The system (10) also includes a supply optimizer engine (14) that receives the service plan from the demand optimizer engine (12) and generates a service schedule for one or more of the planned service events based on information regarding the flow of one or more parts used in conjunction with the services of each planned service event. The service schedule includes a scheduled start time and a scheduled end time for the one or more planned service events. The supply optimizer engine (14) communicates the service schedule to the demand optimizer engine (12) and the demand optimizer engine (12) modifies the service plan according to the service schedule received from the supply optimizer engine (14).

36 Claims, 2 Drawing Sheets

U.S. PATENT DOCUMENTS

| | | | |
|---|---|---|---|
| 6,151,582 A | 11/2000 | Huang et al. | 705/8 |
| 6,195,590 B1 * | 2/2001 | Powell | 700/36 |
| 6,216,109 B1 * | 4/2001 | Zweben et al. | 705/8 |
| 6,317,725 B1 * | 11/2001 | Muraoka | 705/28 |
| 6,324,522 B2 | 11/2001 | Peterson et al. | 705/28 |
| 6,430,541 B1 | 8/2002 | Brown et al. | 705/28 |
| 6,438,436 B1 * | 8/2002 | Hohkibara et al. | 700/97 |
| 6,486,899 B1 | 11/2002 | Bush, Jr. | 345/855 |
| 6,560,509 B2 | 5/2003 | Williams et al. | 700/216 |
| 6,606,529 B1 * | 8/2003 | Crowder et al. | 700/100 |
| 6,801,820 B1 * | 10/2004 | Lilly et al. | 700/100 |
| 7,003,475 B1 * | 2/2006 | Friedland et al. | 705/9 |
| 7,313,534 B2 * | 12/2007 | Scheer | 705/9 |
| 2001/0032109 A1 * | 10/2001 | Gonyea et al. | 705/8 |
| 2002/0035495 A1 * | 3/2002 | Spira et al. | 705/7 |
| 2002/0107600 A1 * | 8/2002 | Crampton et al. | 700/100 |
| 2005/0004821 A1 * | 1/2005 | Garrow et al. | 705/7 |
| 2005/0065826 A1 * | 3/2005 | Baker et al. | 705/7 |

OTHER PUBLICATIONS

Jean-Baptiste Waldner, "CIM: Principles of Computer Integrated Manufacturing," John Wiley & Sons (1992) (figure) (found at MRP article on wikipedia Apr. 1, 2008).*

* cited by examiner

| SERVICE/WEEK | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| MOUNTS | | | | | | | | | | | | | | | | | | | | |
| AXIS | | | | | | | | | | | x | x | | | | | | | | |
| FAN | | | | | x | | | | | | | x | x | x | | | | | | |
| EXHAUST | | | | | x | | | | | | | | | | | | | | | |

FIG. 4

| RESOURCE/WEEK | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| SERVICE BAY1 | | | | 11097-3B | 11097-3B | 11097-3B | 11097-3B | | | | | | 115-C | 115-C | 115-C | 115-C | 115-C | | | |
| SERVICE BAY2 | | | | | | | 11035-B | 11035-B | 11035-B | 11035-B | 11035-B | | | | | | | | | |
| CREW_17 | | | | 11097-3B | 11097-3B | 11097-3B | | | | 11035-B | 11035-B | 11035-B | | | 115-C | 115-C | 115-C | 102-C | | |
| CRANE | | | | | | 11035-B | | 115-C | 115-C | | | | 102-C | 102-C | 115-C | | 102-C | | | |

FIG. 5

| ROTABLE SLOT | ROTABLE ID | SOURCE | SOURCE TIME | DESTINATION | DEST. TIME |
|---|---|---|---|---|---|
| COMPRESSOR1 | 3JT3 | 11097-3B | 03-07-01 | 1101-B | 03-22-01 |
| COMPRESSOR2 | 3JX3 | 1102-C | 02-02-01 | 1123-B | 02-26-01 |
| COMPRESSOR3 | 3JX1 | ON-LOAN | 03-28-01 | IN-STOCK | — |
| COMPRESSOR4 | 3JX2 | 1100-B | 01-01-01 | ON-LOAN | 02-21-01 |
| COMPRESSOR5 | 3KX1 | NEW | 10-01-01 | IN-STOCK | — |
| FAN | C47DC3 | NEW | 10-01-01 | IN-STOCK | — |
| FAN | C47DC2 | NEW | 10-01-01 | IN-STOCK | — |

PLANNING AND SCHEDULING OF MAINTENANCE, REPAIR, AND OVERHAUL SERVICES

RELATED APPLICATIONS

This patent application claims priority to U.S. provisional patent application Ser. No. 60/281,104, filed on Apr. 2, 2001, and entitled PLANNING AND SCHEDULING OF MAINTENANCE, REPAIR, AND OVERHAUL SERVICES.

GOVERNMENT RIGHTS

This invention was made with Government support under cooperative agreement number 70NANB9H3023 awarded by the National Institute of Standards and Technology (NIST).

TECHNICAL FIELD OF THE INVENTION

This invention relates to the field of business operations, and more particularly to planning and scheduling of maintenance, repair, and overhaul services.

BACKGROUND OF THE INVENTION

The capital assets of an enterprise (for example, airplanes, power generators, or manufacturing equipment) typically have to be maintained on a regular basis and repaired or overhauled as needed. The downtime of an asset associated with such maintenance, repair, and/or overhaul (MRO) is often very costly to an enterprise since the asset cannot perform its function during an MRO procedure. Present techniques for planning and scheduling MRO of an asset are not efficient and do not minimize the downtime associated with the MRO of an asset. The failure of such present techniques is due in part to the lack of communication and collaboration between the asset operators and the MRO service providers, as well as the difficulty of planning the disposition of serialized rotable parts. This failure may also be due to MRO planning based on time intervals.

SUMMARY OF THE INVENTION

According to the present invention, disadvantages and problems associated with previous techniques for planning and scheduling of asset maintenance, repair, and overhaul services have been substantially reduced or eliminated.

According to one embodiment of the present invention, a system for planning and scheduling service events for one or more assets includes a demand optimizer engine that receives information regarding future service requirements for an asset and operating characteristics of the asset. The demand optimizer engine also generates a service plan identifying one or more planned service events during which one or more services are to be performed on the asset and identifying a planned start time and a planned end time for each service event so as to minimize the amount of time the asset is non-operational and the costs associated with each service event. The system also includes a supply optimizer engine that receives the service plan from the demand optimizer engine and generates a service schedule for one or more of the planned service events based on information regarding the flow of one or more parts used in conjunction with the services of each planned service event. The service schedule includes a scheduled start time and a scheduled end time for the one or more planned service events. The supply optimizer engine communicates the service schedule to the demand optimizer engine and the demand optimizer engine modifies the service plan according to the service schedule received from the supply optimizer engine.

Particular embodiments of the present invention provide one or more technical advantages. For example, certain embodiments provide an MRO planning and scheduling system that provides decision support to enable joint planning and scheduling by asset operators and MRO service providers. Such a system may be used to plan asset arrivals and resource usage at service facilities in order to reduce turn-around times and improve resource utilization at the service facilities. By combining service requirements, asset condition and service capacity, the planning system may provide the service schedule for each asset and the expected usage of service resources. This schedule may be viewed from the perspective of the asset operator showing the expected asset downtimes and the services that should be performed while the asset is down. From the perspective of the service provider, the schedule may show the expected allocation of service resources to assets. The schedule enables joint resolution of conflicts between assets operators and service providers.

The joint planning and scheduling of MRO services using particular embodiments may provide many improvements over previous MRO planning techniques. These improvements may include increased operational time of assets subject to MRO services, reduced MRO service turn-around time associated with MRO services, reduced inventory at the MRO service provider, reduced inventory of rotable parts for both the asset operator and the MRO service provider, and reduced capital investment in spares and service resources for the MRO service provider.

Other technical advantages may be readily apparent to those skilled in the art from the figures, description and claims included herein.

BRIEF DESCRIPTION OF THE DRAWINGS

To provide a more complete understanding of the present invention and the features and advantages thereof, reference is made to the following description taken in conjunction with the accompanying drawings, in which.

DESCRIPTION OF EXAMPLE EMBODIMENTS

Figure 1:
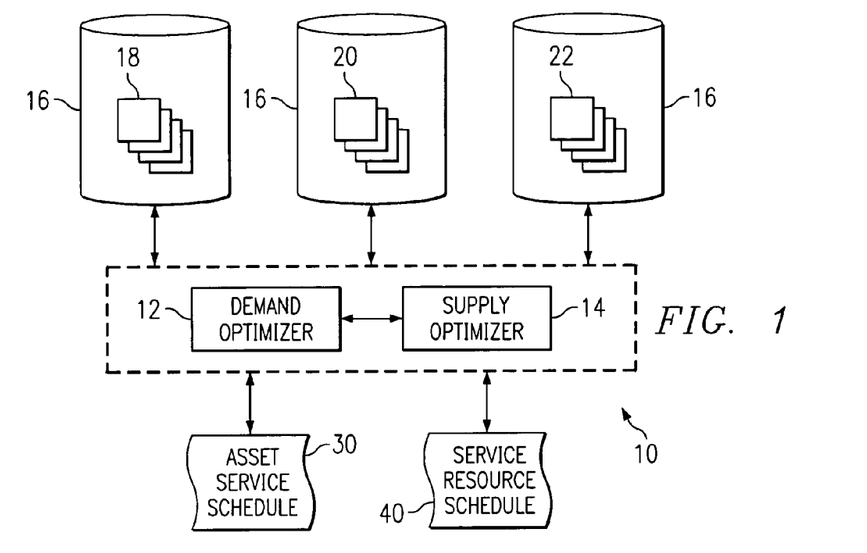
FIG. 1 illustrates an exemplary maintenance, repair, and/or overhaul (MRO) planning and scheduling system.

FIG. 1 illustrates an example maintenance, repair, and/or overhaul (MRO) planning and scheduling system 10. System 10 may be used to plan and schedule MRO services to be performed by an MRO service provider on an asset controlled by an asset owner, asset operator, or other party controlling the servicing of an asset (collectively referred to as an "asset controller"). System 10 provides visibility into the MRO service capacity of one or more MRO service providers and the MRO service needs of one or more asset controllers. System 10 leverages this visibility to provide decision support to enable joint planning and scheduling of MRO services by these asset operators and MRO service providers. For example, system 10 may be used to plan asset arrivals and resource usage at service facilities in order to reduce turn-around times and improve resource utilization at service facilities. System 10 may receive input from and provide output to asset controllers and MRO service providers regarding the planning and scheduling of MRO services using any appropriate techniques. For example, one or more of the components of system 10 described below may be implemented in conjunction with a web server and may be accessible using the Internet and/or other communication networks.

System 10 includes components that enable the planning and scheduling of MRO services. These components include a demand optimizer engine 12 that may be used to generate a plan for MRO service "events" for one or more assets such that the effect of the service events on the operation of the assets is minimized. Demand optimizer 12 generates such a plan based on a model that predicts an asset's future requirements for service and determines when to perform a particular service on an asset to minimize downtime and service cost. For example, if the asset on which a service is to be performed is an aircraft engine, demand optimizer 12 may avoid scheduling MRO services during peak air travel times, such as around holidays. In generating the service plan, demand optimizer 12 may use: a) a catalog of asset information (including asset condition); b) a catalog of MRO services; c) a model of how the conditions deteriorate with use and/or over time (a "wear model"); d) a set of maintenance rules that provide operating limits on condition values and prescribe repair operations when such limits are exceeded; e) a hybrid model in which a service event is bounded by continuous start and end times; f) an asset status (operable or in MRO service) at each discrete time point; g) a set of assumptions relating to the cost of and lead time associated with particular MRO services; h) the cost of downtime for each asset; and/or i) the cost of transitioning an asset between operation and service.

The service plan developed by demand optimizer 12 is communicated to a supply optimizer engine 14. Although demand optimizer 12 generates a service plan, it does so without actual knowledge of MRO service facility turn-around times and capacity. In other words, the plan is optimized for the asset controllers without taking into account the actual length of time an MRO service will take and the availability of the MRO service facilities. Supply optimizer 14 is used to modify the service plan to "real-world" conditions by generating a schedule for MRO services based on actual MRO service facility turn-around times and capacity. Supply optimizer 14 tracks the flow of rotable parts involved in the MRO services (rotable parts are those parts that are removed from an asset, serviced, and then reused in the same or a different asset) and the timing and location of the MRO service events. The goal of supply optimizer 14 in generating this schedule is to satisfy the demand for service identified in the service plan at minimum cost and to reduce turn-around time.

As with demand optimizer 12, supply optimizer 14 uses a model to determine the MRO service schedule. In determining the service schedule, supply optimizer 14 may use service routings (a specification of the resources required for each service type), a rotable part flow specifying initial rotable part inventories and repairable rotable parts being serviced, and demands for services identified in the service plan. One principle behind the model used by supply optimizer 14 is the careful management of rotable part inventories so as to reduce turn-around time without an exorbitant increase in inventories. It may be assumed that one or more of the assets to be repaired have a modular structure, thus allowing a rotable part to be refurbished in advance of the asset's arrival in the service facility. The optimization of the flow of rotable parts or other spare parts is especially advantageous for expensive, long lead time parts. Since these parts are expensive, it is not economically efficient to keep a large inventory of the parts to meet an unknown demand for MRO services. Furthermore, since these parts require a long lead time to produce, it is not efficient for these parts to be made-to-order (or refurbished-to-order) when an MRO service is requested (assuming little or no advance notice is given). Supply optimizer 14 may also select rotable parts for the service of an asset so as to match the remaining time to the next service of the other rotable parts already in the asset. This minimizes the number of times as asset must be brought down for service and maximizes the usage of the rotable part life. Furthermore, supply optimizer 14 may schedule the repair and/or purchase of rotable parts to meet minimum or maximum inventory target levels.

As described above, in particular embodiments demand optimizer 12 does not initially consider actual service capacity or turn-around times (which are determined largely by critical part availability). Instead, demand optimizer 12 may use standard repair turn-around times that are calculated from empirical distributions (for example, at a ninety percent certainty level). However, these standard turn-around times in particular circumstances may be five to ten times greater than actual process "touch times" (the amount of time an asset is being serviced) because the turn-around times incorporate average queue times that are often caused by the lack of available parts to perform the appropriate MRO service. Given information from demand optimizer 12 regarding when a particular service event is requested, supply optimizer 14 may greatly reduce these turn-around times by managing the rotable part flow such that the required rotable parts will be available when the asset is brought in for a service event. This actual turn-around time will typically be less than the assumed turnaround time used by demand optimizer 12 since the turn-around time has been reduced by providing information about an upcoming planned service event. Since supply optimizer 14 may reserve parts and resources, the need to incorporate high degree of certainty estimates of turn-around-time is eliminated. Due to the shorter turn-around time, subsequent service events on the asset may be planned too late (since there may be a maximum asset operating time between services). Therefore, demand optimizer 12 may alter the plan and move the subsequent service event accordingly.

In particular embodiments it may be assumed that the start time for a service event planned by demand optimizer 12 may not be altered by supply optimizer 14 (assuming that the service events are planned far enough in advance so that the relevant service facility is available to perform the service). In such a case, the end time may be adjusted due to an earlier or later end time provided by supply optimizer 14 (based on the actual turn-around time). However, other embodiments may provide for the start time of a service event to be changed as appropriate. For example, if the scheduled service time is later than the service time indicated in the plan (for example, if there is not enough service facility capacity), the plan may then be adjusted to assure that any additional asset operating time does not violate any maintenance rules.

As can be seen from the foregoing, demand optimizer 12 and supply optimizer 14 may interact to generate significant improvements in service schedule based on constraints imposed by the asset controllers and/or the MRO service providers. The process flow of this interaction may take many forms; however, the following process flow is one example of this interaction. The example process flow begins with demand optimizer 12 generating a plan for several successive MRO service events for one or more assets during a planning horizon. The number of service events generated may be specified by a user to reduce the edge effects due to a finite horizon while maintaining a reasonable execution time needed to generate the service plan. Demand optimizer 12 may then send a request to supply optimizer 14 to schedule one or more service events in the planning horizon. Based on information about the availability of critical parts for the service event, the availability of critical resources for the service event, and the previously scheduled service events across all MRO service providers, supply optimizer 14 resolves the resource and part requirements for the requested service event.

Supply optimizer 14 schedules the service event using particular service resources and locates parts for the service (such as rotable parts) according to its optimization model. Supply optimizer 14 then reports back the scheduled start and completion times for the requested service event (based on the actual turn-around time) to demand optimizer 12. Demand optimizer 12 adjusts, if appropriate, previously planned dates for the requested service event. If the scheduled service event causes a violation of the service plan generated by demand optimizer 12, then demand optimizer 12 may alter the plan as necessary. For example, if the actual turn-around time is less than the turn-around time assumed by demand optimizer 12 and this causes a subsequent service event to become too far in the future, demand optimizer 12 may adjust the plan by moving up the start time of the subsequent service event. This interaction may be repeated until all planned service events are scheduled.

Through the interaction and sharing of information between demand optimizer 12 and supply optimizer 14, many factors associated with the planning and scheduling MRO service events are improved over previous techniques. For example, spare parts may be ordered based on predicted demand for MRO services that is based on the condition of the assets which will need to be serviced. Specific rotable part transitions may be planned in advance. The pre-positioning of the spares and rotables greatly reduces the turn-around time associated with the service event and thus reduces asset downtime and the associated cost of this downtime. The coordinated supply and demand plans reduce uncertainties and therefore reduce the need for safety stocks. Furthermore, service providers can take advantage of the service plan by procuring needed parts, obtaining additional MRO facility capacity, and offering idle capacity in the marketplace.

Demand optimizer 12 and supply optimizer 14 may be implemented as any appropriate combination of software and/or hardware and may operate in association with one or more computers at one or more locations. Furthermore, one or more of the functions of demand optimizer 12 and supply optimizer 14 may be combined in a single optimizer engine and the inputs to demand optimizer 12 and supply optimizer 14 in the scenario above would all be input to the single optimizer engine. As described above, demand optimizer 12 and supply optimizer 14 may be deployed as a set of services available over the Internet, such as in a web marketplace. Such a marketplace may provide platform services, such as authentication, authorization, financial closures, and catalogs. Optimizer engines 12 and 14 may each have an associated web server and messaging interface (such as an extensible markup language messaging interface) to allow communication between engines 12 and 14 and asset controllers and MRO service providers.

System 10 may also include one or more data storage locations 16 in which inputs to and outputs from demand optimizer 12 and/or supply optimizer 14 may be stored (as well as any other appropriate data). The types of input that may be stored in data storage locations 16 for use by demand optimizer 12 and/or supply optimizer 14 or that may be communicated directly to demand optimizer 12 and/or supply optimizer 14 may include the following: a service catalog 18, an asset catalog 20, and MRO service facility capacity information 22. Service catalog 18 may include information describing each type of service provided by the MRO service providers associated with system 10. Each entry in service catalog 18 may be associated with a type of service and include one or more of the following types of information: the service name (for example, "Engine Mount Replacement"); the service trigger (for example, a certain number of hours of operation of an asset); a required downtime (for example, two days); a service cost or estimated cost; required resources for the service (for example, an engine bay for one day, a two person service crew for two days, and a crane for six hours); and the parts needed for the service (for example, a new set of mounts and a new bearing).

Asset catalog 20 may contain information about each asset that is subject to MRO services. Each entry in asset catalog 20 may be associated with a particular asset and include one or more of the following types of information: an asset identifier, asset condition (for example, the number of hours since the last service or services), the rate of usage (for example, fourteen hours per day), the expected rates of wear (which may be expressed using mathematical formulae); the downtime cost; the required uptime (for example, a specific range of dates or particular days in the week or month when the asset must be operational); the preferred downtime (for example, a specific range of dates or particular days of the week or month during which service is preferably performed); and the minimum turn around time. The description of each asset that is maintained may be complex. For example, the asset condition and rate of usage may be tracked for a number of different parts of the asset and relating to a number of different services performed on those parts. Furthermore, the rate of usage for each part may be based on a different measure, such as hours of operation, elapsed time or cycles. Other asset information may also be tracked in this manner as appropriate for particular circumstances.

MRO service facility capacity information 22 includes information relating to the resources available to each MRO service provider, such as shop capacities and crews, and the availability and capacity over a time horizon. Information 22 may also include service costs and service turn-around times. The information included in service catalog 18, asset catalog 20, and MRO service facility capacity information 22 may by communicated to system 10 as appropriate. For example, asset controllers may communicate asset information to system 10 as new assets are acquired and as information relating to an asset changes. Alternatively or in addition, asset information may be communicated to system 10 along with a request for service from an asset controller. Similarly, an MRO service provider may communicate information related to its services when those services are created, when information about a service change, and/or at any other appropriate time. These service providers may also communicate MRO service facility capacity information 22 to system 10 as this service facility capacity changes. Furthermore, demand optimizer 12 and/or supply optimizer 14 may modify capacity information 22 and asset information in catalog 18 as service events are scheduled, initiated, and completed (and thus as the availability of service facilities and the condition of assets changes).

Based on this input, demand optimizer 12 and supply optimizer 14 may collaboratively plan and schedule a number of MRO service events. As described above, demand optimizer 12 and supply optimizer 14 both use models to plan and schedule the MRO service events. The model associated with demand optimizer 12 is used to determine when it may be optimal to take an asset off-line for MRO service and what service(s) should be performed during that down time in order to meet maintenance regulations while minimizing downtime and service cost. A demand optimization model for a particular embodiment of demand optimizer 12 is described below; however, any appropriate model may be used. The model used by demand optimizer 12 may be solved using mixed integer linear programming (MILP) or any other appropriate techniques. The example model described below is initialized with a time horizon (including a start time and an end time) and a vector of MRO service events, MRO[k]. The cardinality of MRO[k] is determined by dividing the time horizon by the shortest MRO service event frequency. The goal of optimization is then to determine the following for each MRO service event, x, in MRO[k] and for each time unit t within the time horizon:

a) x.Start and x.End: These are variables indicating the start and end times of service event X, respectively;
   b) x.NonOperation: This is a binary variable indicating if the MRO service event is a non-operation (not needed). To decrease the time needed to determine an MRO service plan, an initial guess may be made regarding the number of service events that are required for a particular asset. For example, if the asset is a vehicle, an assumption may be made that the minimum number of service events a year will be four service events (since an oil change may need to be performed at least this many times a year). A conservative initial guess may be used that is larger than the expected number of service events, and thus the service plan may indicate that particular service events in the initial guess are not actually needed using x.NonOperation. This variable may be eliminated in particular embodiments where such an initial guess is not made;
   c) x.Condition[i]: This is a vector of conditions at the start of the MRO service event (indexed by condition type). A number of conditions may be tracked for a particular asset. These conditions may be for different parts of the assets and for different types of wear on an asset and/or an asset part. Each condition may have a numerical value indicating the time since the last maintenance relevant to the condition, the time until the next maintenance is need, or any other appropriate measure of the condition of an asset;
   d) x.Service[j]: This is a binary vector of service operations performed during the MRO service event (indexed by service type). Each asset type for which an MRO service plan is developed will have a number of service operations that may be performed on the asset type. For example, service operations for a vehicle may include an oil change, a tire rotation, a transmission fluid change, engine belt replacement, a clutch replacement, and many other types of services. The x.Service[j] may have a zero or one value for each possible service operation, with a value of one indicating that the service operation is to be performed during the planned service event; and
   e) S[t]: This is a binary vector of asset working status (indexed by time t). For example, a value of one may indicate that an asset is down for MRO service.

The objective of the example demand optimization model is to minimize downtime, service cost, and unused asset component life, while considering revenue potential at different time periods (for example, seasonality). These factors may be represented, respectively, by a weighted sum of the following factors (the weighting for each factor may be selected as appropriate for particular circumstances):

a) the total downtime cost $$\left(\sum_t \text{downtime cost}[t] * S[t]\right);$$

b) the sum of the cost of all of the services performed (ServiceCost[j]*x.Service[j]); and
   c) the negative of the sum of the condition values in x.Condition[i] representing unused asset component life;

The example model also includes the following constraints:

a) Recursive Deterioration Constraint—This constraint represents the condition of an asset as it deteriorates between successive MRO services (the equation uses one or more conditions of an asset after the last MRO service event and the time since that service event to determine the present condition(s)):

MRO[$k$+1].Condition[$i$]=MRO[$k$].Condition[$i$]*(1−MRO[$k$].Service[$i$])+MRO[$k$+1].Start−MRO[$k$].End All deterioration models may be normalized to a deterioration rate of one.

b) MRO Service Duration Constraint—This constraint states that the duration of an MRO service event is at least as long as the longest service operation performed during the service event (it may be assumed that the service operations included in a service event are performed in parallel):

MRO[k].End−MRO[k].Start MRO[k].Service[j].duration c) Maintenance Rules—A maintenance rule may be associated with each condition type and may put a limit on the condition (ConditionLimit[i]). For example, the maintenance rule may specify that a condition based on time of operation since the last service event may not exceed a specified time (a condition limit):

MRO[k].Condition[i]≦ConditionLimit[i]

d) Non-Operation Constraint—If a particular service operation is not to be performed during a service event then a Non Operation flag associated with the service operation may be set. This constraint is used to reduce computation time, but may be eliminated in certain circumstances.

1−MRO[k].NonOperation MRO[k].Service[j]

1−MRO[$k$].NonOperation≦sum(MRO[$k$].Service[$j$])

e) Strict Order Constraint—The MRO service events must be performed in order:

MRO[$k$].End<MRO[$k$+1].Start f) Downtime Constraint—This constraint defines the relationship between S[t] and an MRO service event's timing:

If MRO[k].Start≦t≦MRO[k].End then S[t] 1−MRO[k].NonOperation else S[t]=0

Given the above objective and constraints and information included in service catalog 18 and asset catalog 20, an appropriate technique (such as MILP) may be used to determine the above decision variables for one or more service events. These service events may form an MRO service plan that is optimal or acceptable given the objective and the constraints. As described above, the MRO service plan may then be communicated to supply optimizer 14 so that an actual schedule for the service events may be determined.

The purpose of supply optimizer 14 is to generate schedules for MRO service events (including the flow of rotable parts) that improve the overall turn-around time, cost of repair, and part life usage for the whole system. As described above, supply optimizer 14 assumes that the assets to be repaired have a modular structure. Modularity allows rotable parts to be refurbished ahead of time. By scheduling rotable part repair in advance, supply optimizer 14 can achieve a significant reduction in turn-around time with reduced rotable part "safety" inventory. This effect is further enhanced by the advanced warning received from demand optimizer 12 in the form of MRO service plans for the future (for example, for the upcoming year or even longer).

Supply optimizer 14 generates a schedule including a source asset and destination asset for each rotable part as well as the timing and location of repair operations. Each rotable part is tracked as an identifiable entity that may be disassembled from an asset, refurbished, and reassembled into an asset. The source and destination assets of a rotable part need not be the same. In creating a schedule, supply optimizer 14 resolves part, resource, and timing choices in such a way as to minimize the turn-around time, while holding down costs and satisfying appropriate constraints.

Supply optimizer 14 may use a genetic algorithm coupled with a constraint-based schedule builder (a constrain satisfaction engine) to schedule MRO service events specified in a service plan received from demand optimizer 12. An example of the use of genetic algorithms and a schedule builder for scheduling problems is described in U.S. Pat. No. 5,319,781. For example, a genetic algorithm may be employed that utilizes chromosomes which are not simple binary vectors but, rather, are more indirect representations of possible solutions to a scheduling problem, for example, ordered lists of tasks to be performed. Further, the genetic algorithm may be insulated from domain specific knowledge by the inclusion, in the overall system, of a deterministic schedule builder. The schedule builder operates to place the tasks in a given list into a legal schedule (a schedule which complies with the various hard constraints which may be associated with each task). Legal schedules generated in this manner are then evaluated or scored on the basis of the various soft or preferential constraints to determine how good the putative schedule is. The scores of possible solutions are provided as feedback to the genetic algorithm for use in controlling the operators which effect evolution of the population of solutions.

In conjunction with supply optimizer 14, a genetic algorithm is used to determine the priority among the MRO service events (the order in which parts and resources may be reserved for service events). Each chromosome in the genetic algorithm's pool corresponds to one ordering of the set of MRO service events in the service plan. The genetic algorithm generates a pool of chromosomes using a penalty associated with each MRO service event to drive mutation and cross-over operators that generate new chromosomes (again, U.S. Pat. No. 5,319,781 includes details of this process). Given a particular chromosome, the schedule builder then constructs a MRO service schedule, one service event at a time, by finding the locally optimal resolution of each of the MRO service event's choicepoints. The choicepoints for an MRO service event may include finding a source for each part involved in an MRO service event (by either buying the part new or refurbishing a used part) and, if the part is a used part, choosing a service facility to refurbish the part and a time for the refurbishment.

The schedule builder performs an exhaustive search to find a locally optimal (or acceptable) set of choices by interacting with the constraints. The constraints may be either hard constraints (that are never violated by the schedule builder) or soft constraints (the schedule builder searches to find the lowest penalty trade-off among these soft constraints). The constraints may be data driven so they can be tuned to model various industry applications. The constraints may include:

a) Turn-around time penalty—This penalty may be defined as any monotonically increasing piecewise linear function. It may provide a soft constraint (for example, it may provide for a penalty for every hour or day of turn-around time) in one range and a hard constraint thereafter (for example, a specified maximum turn-around time should not be exceeded). The penalty should roughly correspond to the cost of asset downtime or the cost of obtaining an asset to replace an asset being serviced, plus any other intangible costs of delay;

b) Cost of the part—This constraint penalizes for part cost (including the use of new parts, which typically cost more than repaired parts);

c) Hard capacity limits—MRO service facilities have finite capacity that gets used as MRO service events are scheduled for completion using the facilities. Assuming that the specified capacity is a normal operating capacity and not a maximum capacity, the constraint associated with exceeding facility capacity may roughly correspond to a soft constraint that penalizes for the cost of facility overtime until the physical limit of the facility is reached and a hard constraint indicating that the physical limit of the facility cannot be exceeded;

d) Resource choicepoints—These may indicate that there may be several service facilities capable of performing a particular repair;

e) Repair-to level—Specifies that a part may be used only if its remaining life exceeds the specified "repair-to" level. This may be a hard constraint;

f) Wasted life—The difference between the part's remaining life and the required repair-to level is penalized as wasted life. The penalty associated with this constraint may be small compared to the penalties for turn-around time and part cost;

g) Used part availability—This constraint specifies that used parts are made available only after they are removed from their source asset during the associated source service event. There will often be a trade-off between shorter turn-around time and cheaper, more appropriate parts. Because these parts are typically rotable, they can be removed from a source asset and returned to a target asset, but the removal must happen after the source MRO service begins. Since parts can only be refurbished using certain resources, the schedule builder must find an appropriate resource having available capacity. There is an inherent trade-off between waiting for a refurbished part (if an appropriate part is or will be available) which may increase turn-around time and buying a new part which will increase cost;

h) Clustering of time to next service—This constraint drives the selection of rotable parts which have a time to next service similar to the time to the next service of other rotable parts in an asset; and i) Minimum/Maximum Inventory Level—This constraint controls when the repair or purchase of rotable parts takes place. The repair or purchase of rotable parts may match the demand so that minimum and/or maximum inventory level targets are met.

The goal used to determine what an optimal (or acceptable) result is may be to minimize the weighted sum of turn-around time, part cost (including the choice between a new and a used part), and part match (the goal of using of parts whose remaining life is close to but not below the repair-to level). Each chromosome is used to construct a complete schedule by taking each MRO service event in order and finding a local optimum solution for each part that needs to be serviced during a service event. Except for competition for overloaded resources, the parts may be treated as independent. The interaction of parts against multi-purpose resources may be ignored since it creates backtracking. Backtracking on part selection and resource selection generates an exponential number of combinations. Since the interaction among these choices typically has a weak influence on the primary goals (lowered turn-around time and cost reduction), this kind of backtracking may be prevented. Each part requirement may be resolved optimally in reference to the current state of the schedule, but this resolution may remain fixed as the remainder of the schedule is built.

Figure 2:
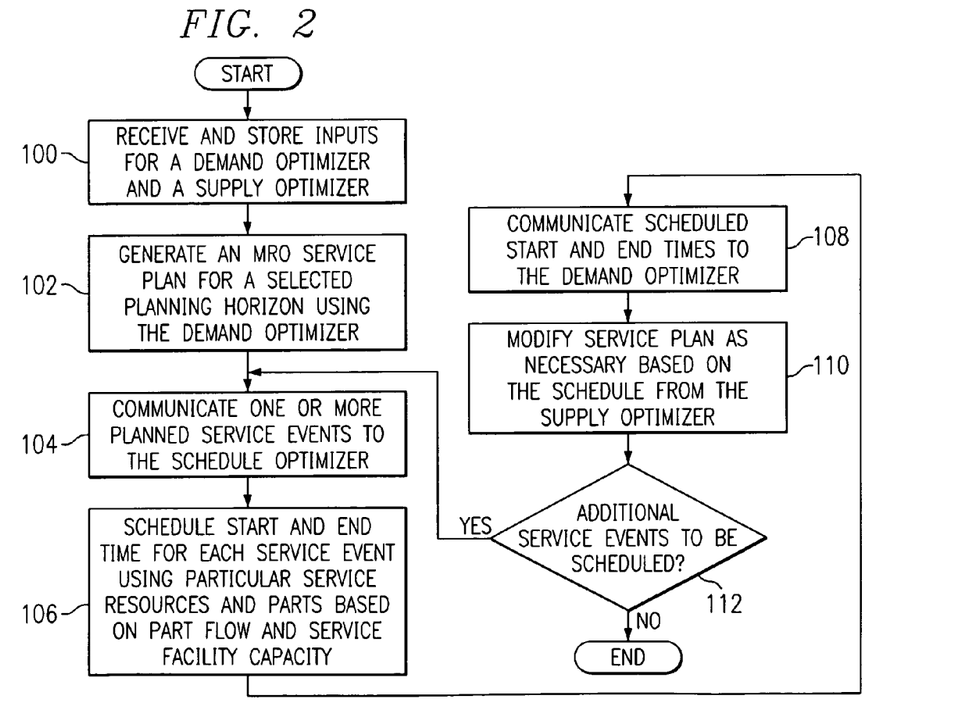
FIG. 2 illustrates an exemplary method of planning and scheduling MRO service events.

FIG. 2 illustrates an example method of planning and scheduling MRO service events. The method begins at step 100 where inputs, such as supply catalog 18, asset catalog 20, and service facility capacity information 22, are communicated to system 10 and stored in one or more data storage locations 16 (or are directly communicated to demand optimizer 12 and/or supply optimizer 14). The inputs may be provided individually or in groups (for example, the information in supply catalog 18 may be provided separately or together) by one or more entities. For example, the asset controllers may provide information relating to the assets and the MRO service providers may provide information relating to MRO services and service facilities. At step 102, demand optimizer 12 generates an MRO service plan that includes one or more service events for one or more assets during a selected planning horizon. As described above, this service plan may be generated using information in service catalog 18 and asset catalog 20 as inputs associated with an MILP model (or any other appropriate model).

Demand optimizer 12 communicates one or more planned service events to supply optimizer 14 at step 104 so that supply optimizer 14 may schedule the service events. Based on information about the availability of critical parts for the service event, the availability of critical resources for the service event, and the previously scheduled service events across all MRO service providers, supply optimizer 14 schedules the service event at step 106 using particular service resources and locates parts for the service (including serialized rotable parts) according to its optimization model, as described above. At step 108, supply optimizer 14 communicates the scheduled start and end times for one or more service events (based on the actual turn-around time associated with the service event) to demand optimizer 12. Demand optimizer 12 modifies, if appropriate, previously planned dates for the service event(s) at step 110. For example, if the scheduled service event causes a violation of the service plan generated by demand optimizer 12, then system 10 may alter the plan as necessary. At step 112, system 10 determines whether there are additional planned service events to be scheduled. If so, the method returns to step 104 and the additional planned events are communicated to supply optimizer 14 for scheduling, as described above. If not, the method ends.

As described above, the interaction between demand optimizer 12 and supply optimizer 14 allows spare parts (including rotable parts) to be ordered based on predicted demand for MRO services that is based on the condition of the assets which will need to be serviced and a model of asset deterioration. The pre-positioning of the spare parts and capacities greatly reduces the turn-around time associated with the service event and thus reduces asset downtime and the associated cost of this downtime. Furthermore, service providers can take advantage of the service plan by procuring needed parts, obtaining additional MRO facility capacity, and offering idle capacity in the marketplace. Output may be provided to MRO service providers that allows the service providers to address these issues. Furthermore, output may also be provided to asset controllers identifying the schedule of MRO services for their associated assets.

Figure 3:
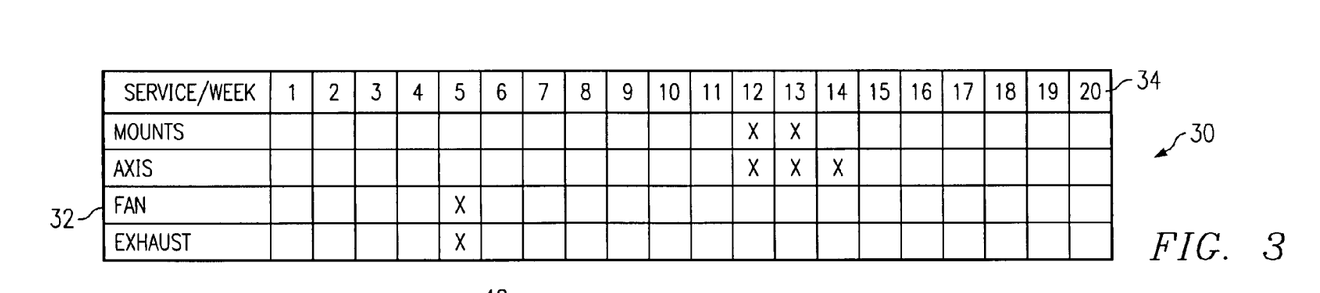
FIG. 3 illustrates an example asset service schedule.
Figure 4:
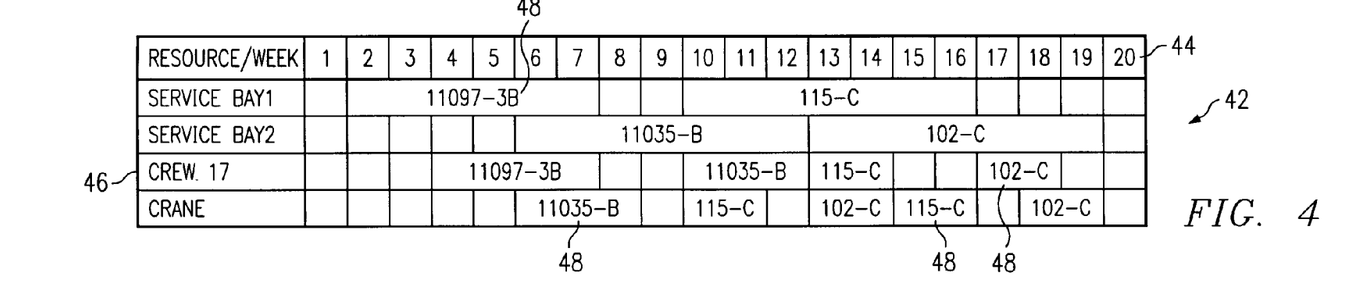
FIG. 4 illustrates an example table providing information regarding the expected dates during which particular service resources will be used to service particular assets.
Figure 5:
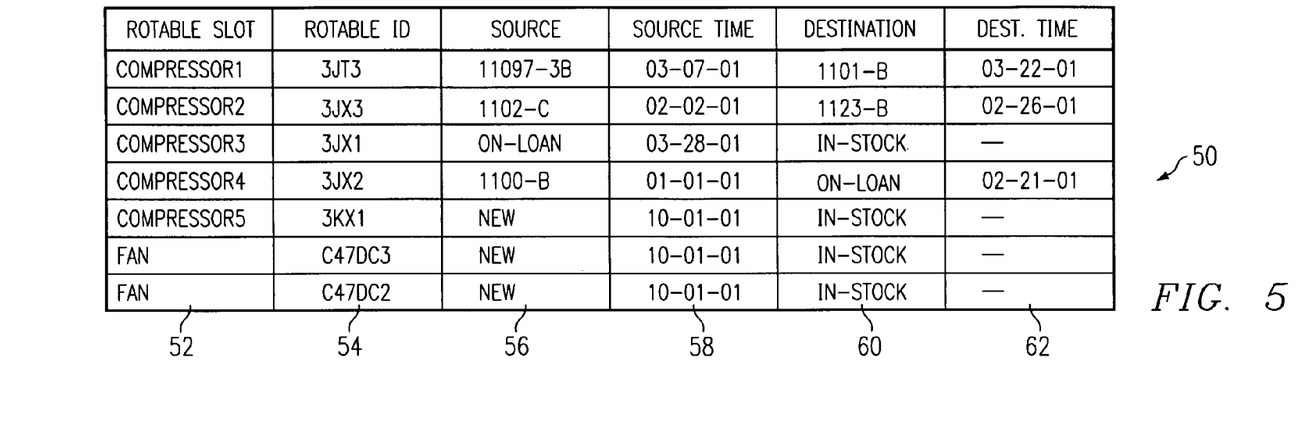
FIG. 5 illustrates an example table identifying the planned utilization of rotable parts.

FIGS. 3-5 illustrates example output from system 10 resulting from the interaction of demand optimizer 12 and supply optimizer 14. Although example outputs are described, system 10 may communicate any appropriate information in any appropriate format to the MRO service providers and/or asset controllers. These outputs may also be communicated to these entities at any appropriate time using and appropriate techniques. In particular embodiments, system 10 may generate two types of outputs: asset service schedules 30 and a service resource schedules 40.

FIG. 3 illustrates an example asset service schedule 30. An asset service schedule 30 may be generated for each asset on which service is to be performed. Each asset service schedule 30 identifies the services 32 that are to be performed on the asset and the dates 34 of the service events during which these services are to be performed (the down-time). As is illustrated, this information may be provided in a tabular format; however, any other appropriate formats may alternatively or additionally be used. For example, the information in asset service schedule 30 may be provided as data that is formatted for input into a planning system or a calendar application used by an asset controller to keep track of upcoming service events. It will be understood that any appropriate type and number of services 32 may be included in each asset service schedule 30 and the dates 34 for which each service is scheduled may be identified by week (as is illustrated), by day, by hour, or according to any other appropriate time interval or calendaring technique.

FIGS. 4 and 5 illustrate example components 42 and 50 of a service resource schedule 40. FIG. 4 illustrates an example table 42 providing information regarding the expected dates 44 during which particular service resources 46 will be used to service particular assets 48. The resources 46 may be divided between multiple tables 42 as appropriate. For example, all of the service resources 46 that are included in a service facility may be included in a single table 42. Therefore, if an MRO service provider operates multiple service facilities, multiple tables 42 may be communicated to that service provider. Alternatively or in addition, service resources may be organized and/or placed in different tables 42 according to resource type, location, or any other appropriate characteristics. As is illustrated, this information may be provided in a tabular format; however, any other appropriate formats may alternatively or additionally be used. For example, the information in table 42 may be provided as data that is formatted for input into a planning system or a calendar application used by an MRO service provider to keep track of upcoming service events. It will be understood that any appropriate type and number of resources 46 may be included in each table 42 and the dates 44 for which each resource is scheduled to be used may be identified by week (as is illustrated), by day, by hour, or according to any other appropriate time interval or calendaring technique.

FIG. 5 illustrates an example table 50 identifying the planned utilization of rotable parts. Table 50 may specify a rotable slot 52 that identifies the type of each rotable part and a rotable part identifier 54 that identifies the particular part I.D. assigned to each rotable part included in table 50. Table 50 also may include a source asset identifier 56 indicating the asset from which the rotable part is taken (or whether the rotable part is new, on-loan, or has another appropriate source status), a source time 58 indicating when the rotable part is to be taken from the source asset or otherwise acquired, a destination identifier 60 indicating that asset into which the rotable part is to be included after the part has been refurbished, if applicable (or any other appropriate destination for the rotable part), and a destination time 62 indicating when the rotable part is to be included in the destination asset or otherwise delivered to a destination. As described above, although illustrated in a tabular format, any other appropriate formats may alternatively or additionally be used and any other appropriate information may be included in table 50.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for planning and scheduling service events of one or more assets, comprising:
one or more computers coupled with one or more data storage locations, the one or more computers comprising:
a demand optimizer engine stored in a storage medium of the one or more computers, the demand optimizer engine configured to:
receive information regarding future service requirements for an asset and operating characteristics of the asset, the information comprising rate of usage information about each asset, required uptime information about each asset, information about each type of service, service facility capacity information and a wear model for deterioration of the asset over time; and
generate a service plan identifying one or more planned service events during which one or more services are to be performed on the asset, the service plan including a planned start time and a planned end time for each service event that minimizes the amount of time the asset is non-operational and minimizes the costs associated with each service event; and
a supply optimizer engine stored in the storage medium of the one or more computers, the supply optimizer engine configured to:
receive the service plan from the demand optimizer engine;
generate a service schedule for one or more of the planned service events based on information regarding the current flow and inventory of one or more parts, wherein the one or more parts comprise at least one of a rotable part or a spare part used in conjunction with the services of each planned service event and current turn-around time and capacity of a service facility at which the service event occurs, the service schedule including a scheduled start time and a scheduled end time for the one or more planned service events; and
communicate the service schedule to the demand optimizer engine, wherein the supply optimizer engine communicates the service schedule to the demand optimizer engine subsequent to receiving the generated service plan from the demand optimizer engine;
the demand optimizer engine further configured to modify the service plan according to the generated service schedule.

2. The system of claim 1, wherein the demand optimizer engine is further configured to generate the planned service start time and end time for each service event to minimize unused asset life.

3. The system of claim 1, wherein the demand optimizer engine is further configured to generate the planned service start time and end time for each service event without considering the flow of one or more parts used in conjunction with the services of each planned service event or the capacity of one or more service facilities used to perform the services of each planned service event.

4. The system of claim 1, wherein the information regarding the future service requirements comprises the asset condition and one or more maintenance rules specifying an asset condition at which a service should be performed.

5. The system of claim 1, wherein the operating characteristics comprise information relating to one or more preferred times for services to be performed on an asset.

6. The system of claim 1, wherein the cost associated with a service event comprises the cost of the services performed during the service event and the cost of the asset being non-operational during the service event.

7. The system of claim 1, wherein:
the demand optimizer engine is further configured to use an estimation of the turn-around time associated with a service event to determine a planned end time for the service event; and
the supply optimizer engine is further configured to use the information regarding the flow of the one or more parts to determine a turn-around time for the service event and uses the turnaround time and the planned start time for the service event to generate a scheduled end time for the service event.

8. The system of claim 7, wherein the supply optimizer engine is further configured to always use the planned start time as the scheduled start time.

9. The system of claim 1, wherein the supply optimizer engine is further configured to generate a service schedule for one or more of the planned service events based on minimizing cost and turn-around time.

10. The system of claim 1, wherein modifying the service plan according to the service schedule comprises modifying the planned start time of a next service event associated with an asset in response to a difference between a planned end time for a previous service event associated with the asset generated by the demand optimizer engine and a scheduled end time for the previous service event generated by the supply optimizer engine.

11. The system of claim 1, wherein the supply optimizer engine uses a genetic algorithm to generate the service schedule, the genetic algorithm having a plurality of chromosomes each corresponding to a particular ordering of a set of maintenance, repair, and/or overhaul service events.

12. A computer-implemented method of planning and scheduling service events for one or more assets, comprising:
receiving by a computer, information regarding future service requirements for an asset and operating characteristics of the asset, the information comprising rate of usage information about each asset, required uptime information about each asset, information about each type of service, service facility capacity information and a wear model for deterioration of the asset over time;
generating by the computer, a service plan identifying one or more planned service events during which one or more services are to be performed on the asset, the service plan including a planned start time and a planned end time for each service event that minimizes the amount of time the asset is non-operational and minimizes the costs associated with each service event;

generating by the computer, a service schedule for one or more of the planned service events based on information regarding the current flow and inventory of one or more parts, wherein the one or more parts comprise at least one of a rotable part or a spare part used in conjunction with the services of each planned service event and current turn-around time and capacity of a service facility at which the service event occurs, the service schedule including a scheduled start time and a scheduled end time for the one or more planned service events; and modifying by the computer, the service plan according to the generated service schedule.

13. The method of claim 12, further comprising generating the planned service start time and end time for each service event to minimize unused asset life.

14. The method of claim 12, further comprising generating the planned service start time and end time for each service event without considering the flow of one or more parts used in conjunction with the services of each planned service event or the capacity of one or more service facilities used to perform the services of each planned service event.

15. The method of claim 12, wherein the information regarding the future service requirements comprises the asset condition and one or more maintenance rules specifying an asset condition at which a service should be performed.

16. The method of claim 12, wherein the operating characteristics comprise information relating to one or more preferred times for services to be performed on an asset.

17. The method of claim 12, wherein the cost associated with a service event comprises the cost of the services performed during the service event and the cost of the asset being non-operational during the service event.

18. The method of claim 12, wherein:
an estimation of the turn-around time associated with a service event is used to determine a planned end time for the service event; and
the information regarding the flow of the one or more parts is used to determine a turn-around time for the service event and the turn-around time and the planned start time for the service event are used to generate a scheduled end time for the service event.

19. The method of claim 18, wherein the supply optimizer engine always uses the planned start time as the scheduled start time.

20. The method of claim 12, further comprising generating a service schedule for one or more of the planned service events based on minimizing cost and turn-around time.

21. The method of claim 12, wherein modifying the service plan according to the service schedule comprises modifying the planned start time of a next service event associated with an asset in response to a difference between a planned end time for a previous service event associated with the asset generated by the demand optimizer engine and a scheduled end time for the previous service event generated by the supply optimizer engine.

22. The method of claim 12, wherein the service schedule is generated using a genetic algorithm, the genetic algorithm having a plurality of chromosomes each corresponding to a particular ordering of a set of maintenance, repair, and/or overhaul service events.

23. A non-transitory computer-readable medium embodied with software for planning and scheduling service events for one or more assets, the software when executed, using one or more computers is configured to:

receive information regarding future service requirements for an asset and operating characteristics of the asset, the information comprising information about each asset, information about each type of service, service facility capacity information and a wear model for deterioration of the asset over time;

generate a service plan identifying one or more planned service events during which one or more services are to be performed on the asset, the service plan including a planned start time and a planned end time for each service event that minimizes the amount of time the asset is non-operational and minimizes the costs associated with each service event;

generate a service schedule for one or more of the planned service events based on information regarding the current flow and inventory of one or more parts, wherein the one or more parts comprise at least one of a rotable part or a spare part used in conjunction with the services of each planned service event and current turn-around time and capacity of a service facility at which the service event occurs, the service schedule including a scheduled start time and a scheduled end time for the one or more planned service events; and modify the generated service plan according to the generated service schedule.

24. The computer-readable medium of claim 23, wherein the software is further configured to generate the planned service start time and end time for each service event to minimize unused asset life.

25. The computer-readable medium of claim 23, wherein the software is further configured to generate the planned service start time and end time for each service event without considering the flow of one or more parts used in conjunction with the services of each planned service event or the capacity of one or more service facilities used to perform the services of each planned service event.

26. The computer-readable medium of claim 23, wherein the information regarding the future service requirements comprises the asset condition and one or more maintenance rules specifying an asset condition at which a service should be performed.

27. The computer-readable medium of claim 23, wherein the operating characteristics comprise information relating to one or more preferred times for services to be performed on an asset.

28. The computer-readable medium of claim 23, wherein the cost associated with a service event comprises the cost of the services performed during the service event and the cost of the asset being non-operational during the service event.

29. The computer-readable medium of claim 23, wherein:
an estimation of the turn-around time associated with a service event is used to determine a planned end time for the service event; and
the information regarding the flow of the one or more parts is used to determine a turn-around time for the service event and the turn-around time and the planned start time for the service event are used to generate a scheduled end time for the service event.

30. The computer-readable medium of claim 29, wherein the planned start time is always used as the scheduled start time.

31. The computer-readable medium of claim 23, wherein the software is further configured to generate a service schedule for one or more of the planned service events based on minimizing cost and turn-around time.

32. The computer-readable medium of claim 23, wherein modifying the service plan according to the service schedule comprises modifying the planned start time of a next service event associated with an asset in response to a difference between a planned end time for a previous service event associated with the asset and a scheduled end time for the previous service event.

33. The computer-readable medium of claim 23, wherein the service schedule is generated using a genetic algorithm, the genetic algorithm having a plurality of chromosomes each corresponding to a particular ordering of a set of maintenance, repair, and/or overhaul service events.

34. A system for planning and scheduling service events for one or more assets, comprising:
- one or more computers coupled with one or more data storage locations, the one or more computers comprising:
  - a demand optimizer engine stored in a storage medium of the one or more computers, the demand optimizer engine configured to:
    - receive information regarding future service requirements for an asset and operating characteristics of the asset, the information comprising rate of usage information about each asset, required uptime information about each asset, information about each type of service, service facility capacity information and a wear model for deterioration of the asset over time, the information regarding the future service requirements comprising the asset condition and one or more maintenance rules specifying an asset condition at which a service should be performed; and
    - generate a service plan identifying one or more planned service events during which one or more services are to be performed on the asset, the service plan including a planned start time and a planned end time for each service event that minimizes the amount of time the asset is non-operational and minimizes the costs associated with each service event, the demand optimizer engine using an estimation of the turn-around time associated with a service event to determine a planned end time for the service event; and
  - a supply optimizer engine stored in the storage medium of the one or more computers, the supply optimizer engine configured to:
    - receive the service plan from the demand optimizer engine;
    - generate a service schedule for one or more of the planned service events based on information regarding the current flow and inventory of one or more parts, wherein the one or more parts comprise at least one of a rotable part or a spare part used in conjunction with the services of each planned service event and based on the current capacity and turn-around time of one or more service facilities used to perform the services of each planned service event, the service schedule including a scheduled start time and a scheduled end time for the one or more planned service events, the supply optimizer engine using the information regarding the flow of the one or more parts to determine a turn-around time for the service event and using the turn-around time and the planned start time for the service event to generate a scheduled end time for the service event; and
    - communicate the service schedule to the demand optimizer engine, wherein the supply optimizer engine communicates the service schedule to the demand optimizer engine subsequent to receiving the generated service plan from the demand optimizer engine;
  - the demand optimizer engine further configured to modify the service plan according to the generated service schedule.

35. A computer-implemented method for planning and scheduling service events for one or more assets, comprising:
- receiving by a computer, information regarding future service requirements for an asset and operating characteristics of the asset, the information comprising rate of usage information about each asset, required uptime information about each asset, information about each type of service, service facility capacity information and a wear model for deterioration of the asset over time, the information regarding the future service requirements comprising the asset condition and one or more maintenance rules specifying an asset condition at which a service should be performed;
- generating by the computer, a service plan identifying one or more planned service events during which one or more services are to be performed on the asset, the service plan including a planned start time and a planned end time for each service event that minimizes the amount of time the asset is non-operational and minimizes the costs associated with each service event, the demand optimizer engine using an estimation of the turn-around time associated with a service event to determine a planned end time for the service event;
- generating by the computer, a service schedule for one or more of the planned service events based on information regarding the current flow and inventory of one or more parts, wherein the one or more parts comprise at least one of a rotable part or a spare part used in conjunction with the services of each planned service event and based on the current capacity and turn-around time of one or more service facilities used to perform the services of each planned service event, the service schedule including a scheduled start time and a scheduled end time for the one or more planned service events, the information regarding the flow of the one or more parts used to determine a turn-around time for the service event and using the turn-around time and the planned start time for the service event used to generate a scheduled end time for the service event; and
- modifying by the computer, the service plan according to the generated service schedule.

36. A non-transitory computer-readable medium embodied with software for planning and scheduling service events for one or more assets, the software when executed, using one or more computers is configured to:
- receive information regarding future service requirements for an asset and operating characteristics of the asset, the information comprising rate of usage information about each asset, required uptime information about each asset, information about each type of service, service facility capacity information and a wear model for deterioration of the asset over time, the information regarding the future service requirements comprising the asset condition and one or more maintenance rules specifying an asset condition at which a service should be performed;
- generate a service plan identifying one or more planned service events during which one or more services are to be performed on the asset, the service plan including a planned start time and a planned end time for each service event that minimizes the amount of time the asset is non-operational and minimizes the costs associated with each service event, an estimation of the turn-around time associated with a service event used to determine a planned end time for the service event;

generate a service schedule for one or more of the planned service events based on information regarding the current flow and inventory of one or more parts, wherein the one or more parts comprise at least one of a rotable part or a spare part used in conjunction with the services of each planned service event and based on the current capacity and turn-around time of one or more service facilities used to perform the services of each planned service event, the service schedule including a scheduled start time and a scheduled end time for the one or more planned service events, the information regarding the flow of the one or more parts used to determine a turn-around time for the service event and the turn-around time and the planned start time for the service event used to generate a scheduled end time for the service event; and communicate the service schedule to the demand optimizer engine subsequent to receiving the generated service plan form the demand optimizer engine; and modifying the generated service plan according to the generated service schedule.

* * * * *